(12) United States Patent
Lee et al.

(10) Patent No.: US 11,160,107 B2
(45) Date of Patent: Oct. 26, 2021

(54) METHOD FOR PERFORMING A LCP PROCEDURE IN WIRELESS COMMUNICATION SYSTEM AND A DEVICE THEREFOR

(71) Applicant: LG ELECTRONICS INC., Seoul (KR)

(72) Inventors: Jeonggu Lee, Seoul (KR); Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 52 days.

(21) Appl. No.: 16/631,821

(22) PCT Filed: Jul. 19, 2018

(86) PCT No.: PCT/KR2018/008168
§ 371 (c)(1),
(2) Date: Jan. 16, 2020

(87) PCT Pub. No.: WO2019/017707
PCT Pub. Date: Jan. 24, 2019

(65) Prior Publication Data
US 2020/0170035 A1    May 28, 2020

Related U.S. Application Data

(60) Provisional application No. 62/535,237, filed on Jul. 21, 2017.

(51) Int. Cl.
*H04W 72/14*    (2009.01)
*H04L 1/16*    (2006.01)
(Continued)

(52) U.S. Cl.
CPC .......... *H04W 72/14* (2013.01); *H04L 1/1642* (2013.01); *H04W 8/24* (2013.01); *H04W 72/10* (2013.01); *H04W 80/02* (2013.01)

(58) Field of Classification Search
CPC . H04W 72/10; H04W 72/1289; H04W 72/14; H04W 80/02; H04W 8/24; H04L 1/1642
See application file for complete search history.

(56) References Cited

U.S. PATENT DOCUMENTS

2017/0257876 A1*    9/2017 Loehr ................... H04W 72/00
2018/0124634 A1*    5/2018 Jose ................... H04W 72/1242
(Continued)

FOREIGN PATENT DOCUMENTS

CN    106961741    7/2017

OTHER PUBLICATIONS

Qualcomm incorporated, "LCP with Multiple Numerologies"; 3GPP TSG-RAN WG2 Meeting #98 Hangzhou, China May 15-19, 2017; R2-1704903; https://www.3gpp.org/ftp/TSG_RAN/WG2_RL2/TSGR2_98/Docs/R2-1704903.zip (Year: 2017).*
(Continued)

*Primary Examiner* — Gary Mui
(74) *Attorney, Agent, or Firm* — Lee, Hong, Degerman, Kang & Waimey

(57) ABSTRACT

The present invention relates to a wireless communication system. More specifically, the present invention relates to a method and a device for performing a LCP procedure in wireless communication system, the method comprising: receiving multiple uplink (UL) grants, in a state that the UE is configured to one or more logical channels, each of the one or more logical channels being associated with a respective numerology set; wherein each of the multiple UL grants includes information for an associated numerology set; and performing a logical channel prioritization (LCP) procedure
(Continued)

using the multiple UL grants in ascending order of a number of logical channels associated with a numerology set for each UL grant. The UE is capable of communicating with at least one of another UE, a UE related to an autonomous driving vehicle, a base station or a network.

11 Claims, 12 Drawing Sheets

(51) Int. Cl.
*H04W 8/24* (2009.01)
*H04W 72/10* (2009.01)
*H04W 80/02* (2009.01)

(56) References Cited

U.S. PATENT DOCUMENTS

| | | | |
|---|---|---|---|
| 2018/0279358 A1* | 9/2018 | Babaei | H04W 72/0453 |
| 2018/0310308 A1* | 10/2018 | Loehr | H04W 72/10 |
| 2018/0324833 A1* | 11/2018 | He | H04L 47/2416 |
| 2019/0380153 A1* | 12/2019 | Damnjanovic | H04W 72/14 |
| 2020/0077293 A1* | 3/2020 | Lee | H04W 72/1284 |
| 2020/0169356 A1* | 5/2020 | Wang | H04L 5/0007 |
| 2020/0196327 A1* | 6/2020 | Zhang | H04W 72/1242 |

OTHER PUBLICATIONS

PCT International Application No. PCT/KR2018/008168, Notification of Transmittal of the International Search Report and the Written Opinion of the International Searching Authority, or Declaration dated Nov. 6, 2018, 10 pages.
Ericsson, "Prioritization in MAC", 3GPP TSG RAN WG2 Meeting #98, R2-1704398, May 2017, 3 pages.
Ericsson, "Logical channel prioritisation and multiple numerologies", 3GPP TSG RAN WG2 Meeting #98, R2-1704397, May 2017, 3 pages.
Oppo, "LCP considering multiple numerologies", 3GPP TSG RAN WG2 Meeting #98, R2-1704053, May 2017, 4 pages.
Mediatek, "Out of order processing of MAC CEs", 3GPP TSG RAN WG2 Meeting #98, R2-1705518, May 2017, 4 pages.
Huawei, et al., "Remaining issues on LCP with Multiple Numerologies", 3GPP TSG RAN WG2 Meeting #98, R2-1705624, May 2017, 3 pages.
European Patent Office Application Serial No. 18835654.7, Search Report dated Mar. 4, 2021, 11 pages.
Huawei et al., "Multiplexing and LCP procedure of Different TTIs," R2-1701884, 3GPP TSG-RAN WG2 Meeting #97, Feb. 2017, 4 pages.
ZTE, "LCP Modification for LAA Scell," R2-153526, 3GPP TSG-RAN WG2#91, Aug. 2015, 3 pages.
Ericsson, "Prioritization in MAC," Tdoc R2-1704398, 3GPP TSG-RAN WG2 #98, May 2017, 4 pages.

* cited by examiner

[Figure 1]
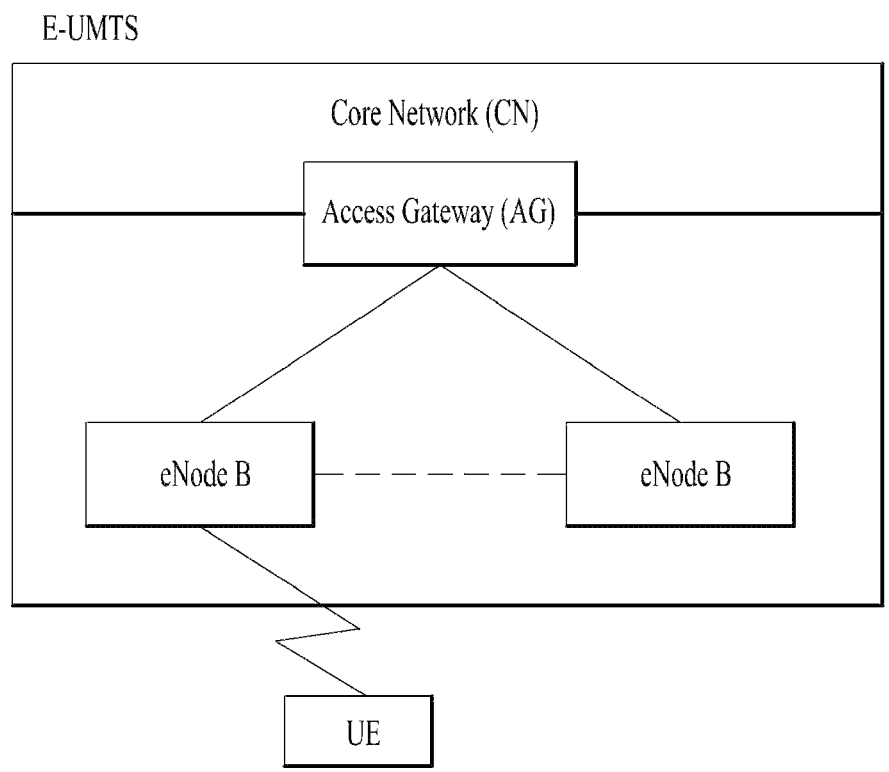
--PRIOR ART--

【Figure 2a】
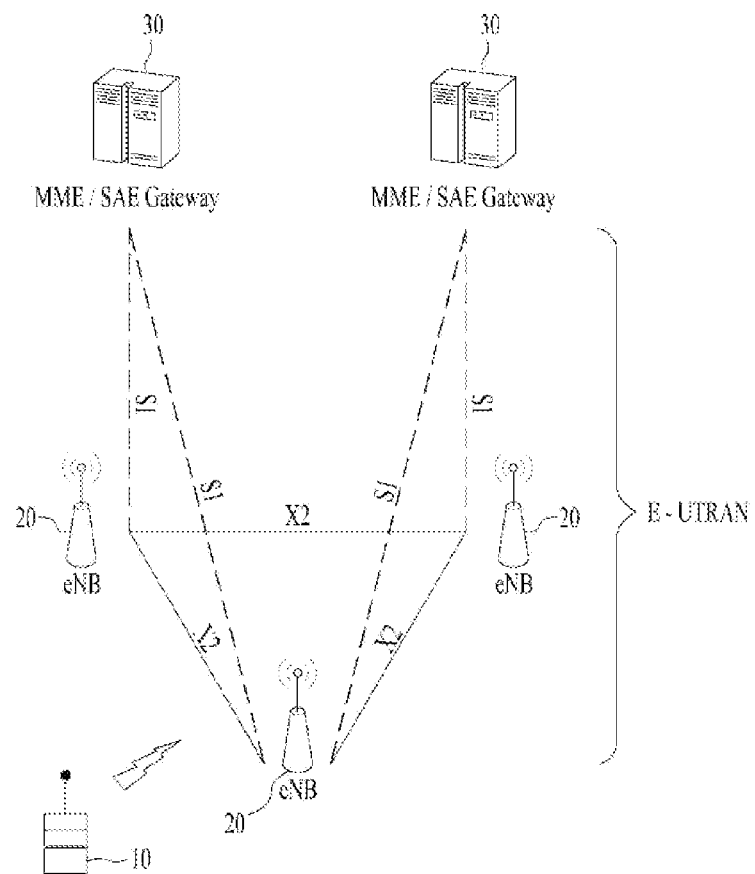
--PRIOR ART--

【Figure 2b】
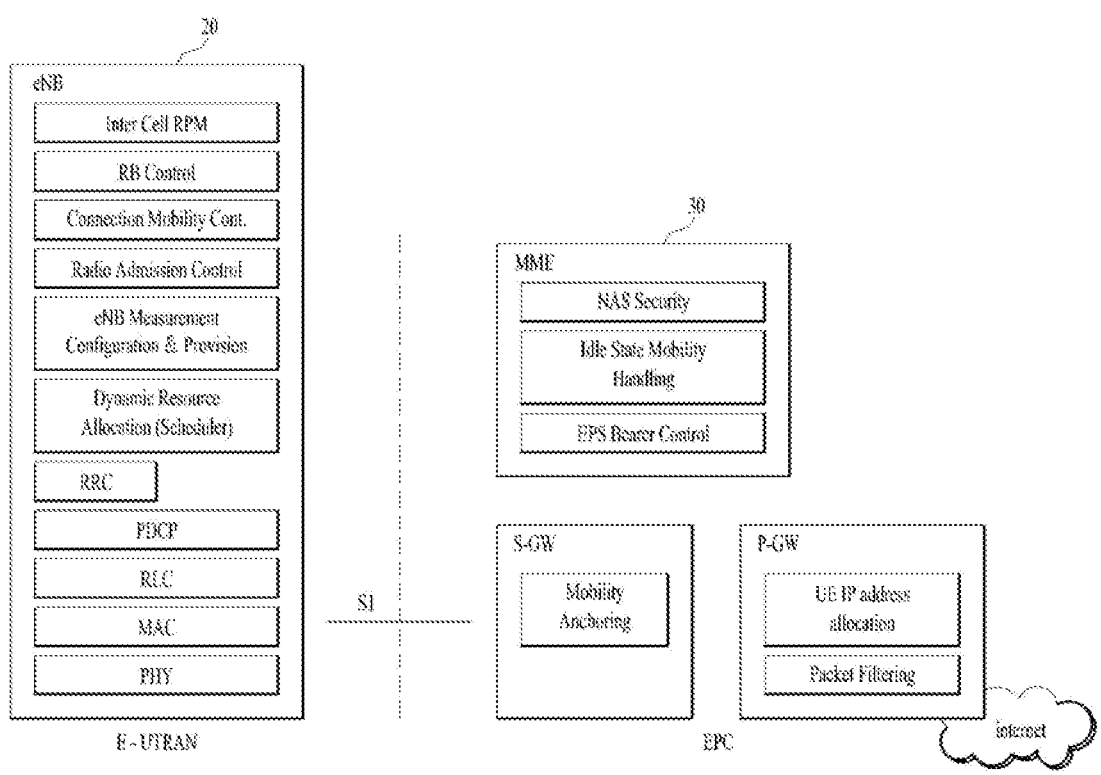
--PRIOR ART--

【Figure 3】
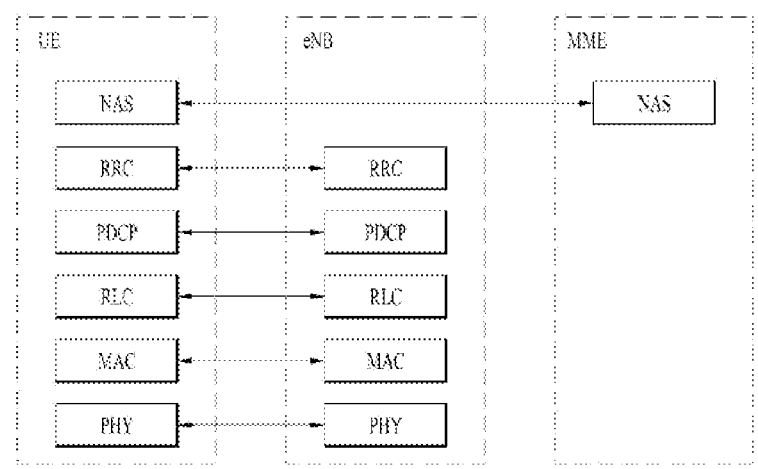
(a) Control-Plane Protocol Stack
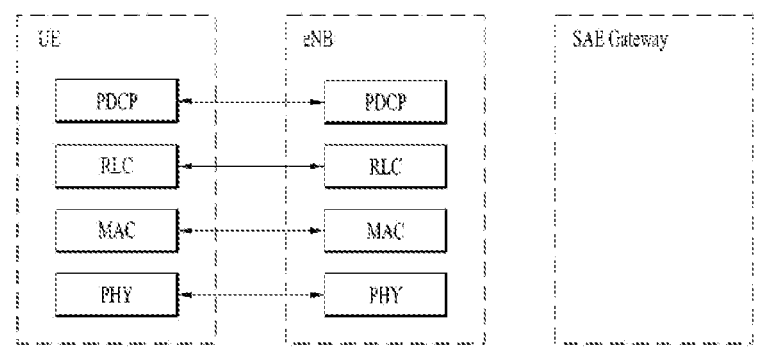
(b) User-Plane Protocol Stack
--PRIOR ART--

[Figure 4a]
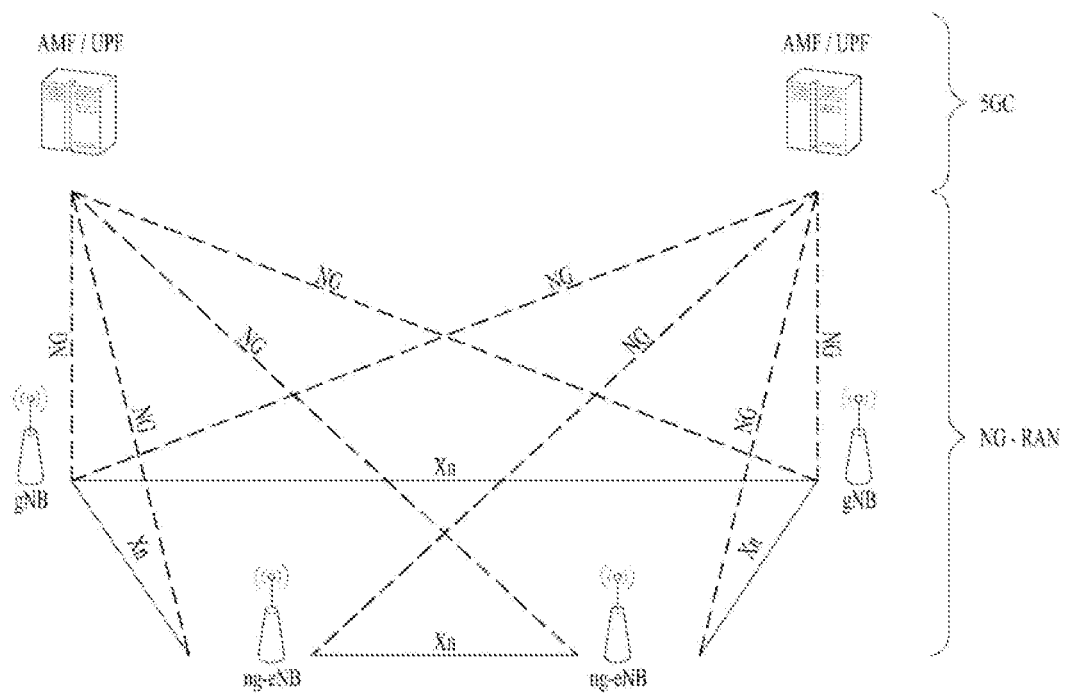
--PRIOR ART--

【Figure 4b】
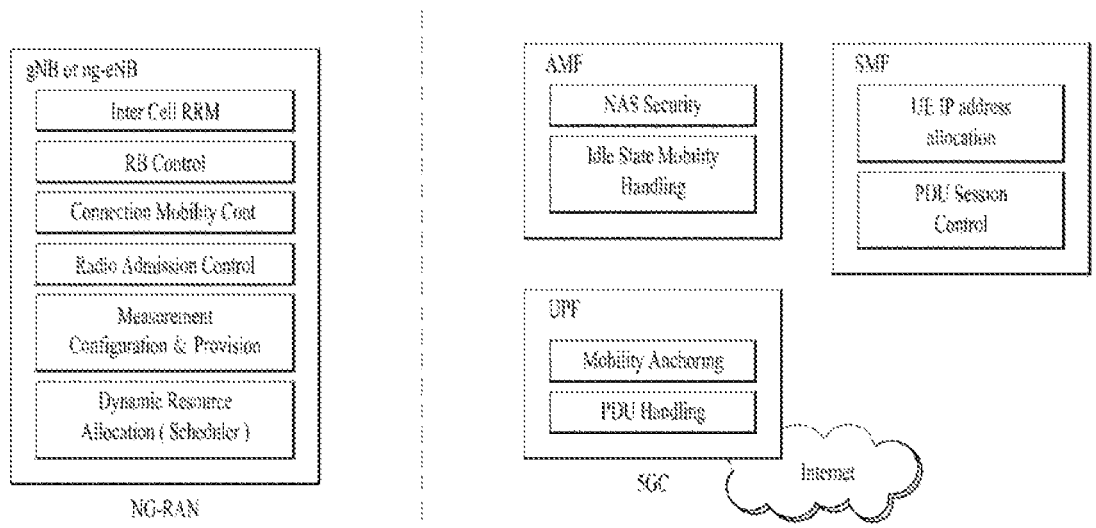
--PRIOR ART--

【Figure 5】
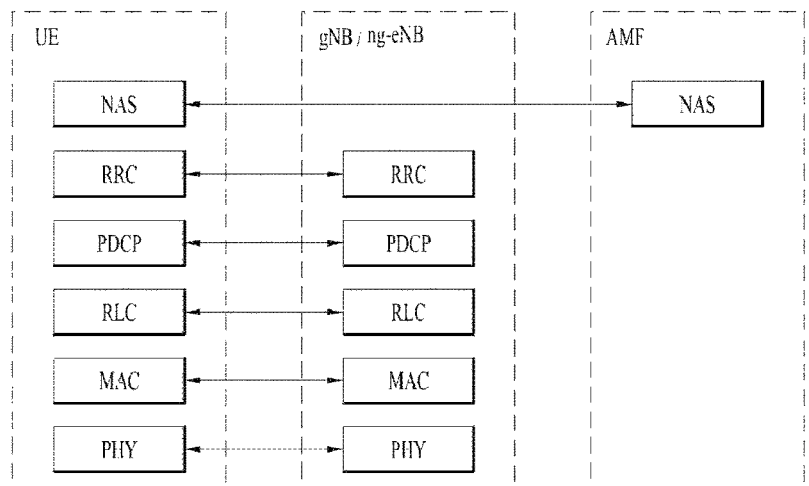
(a) Control-Plane Protocol Stack
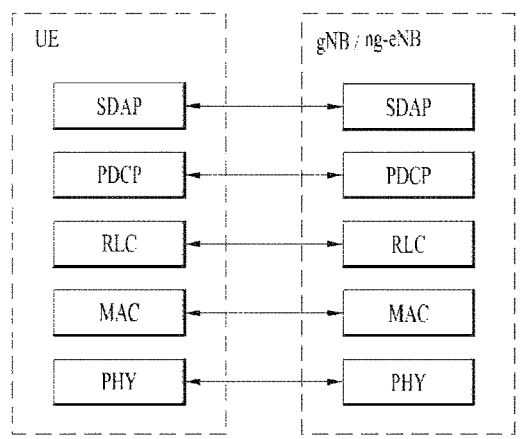
(b) User-Plane Protocol Stack
--PRIOR ART--

【Figure 6】
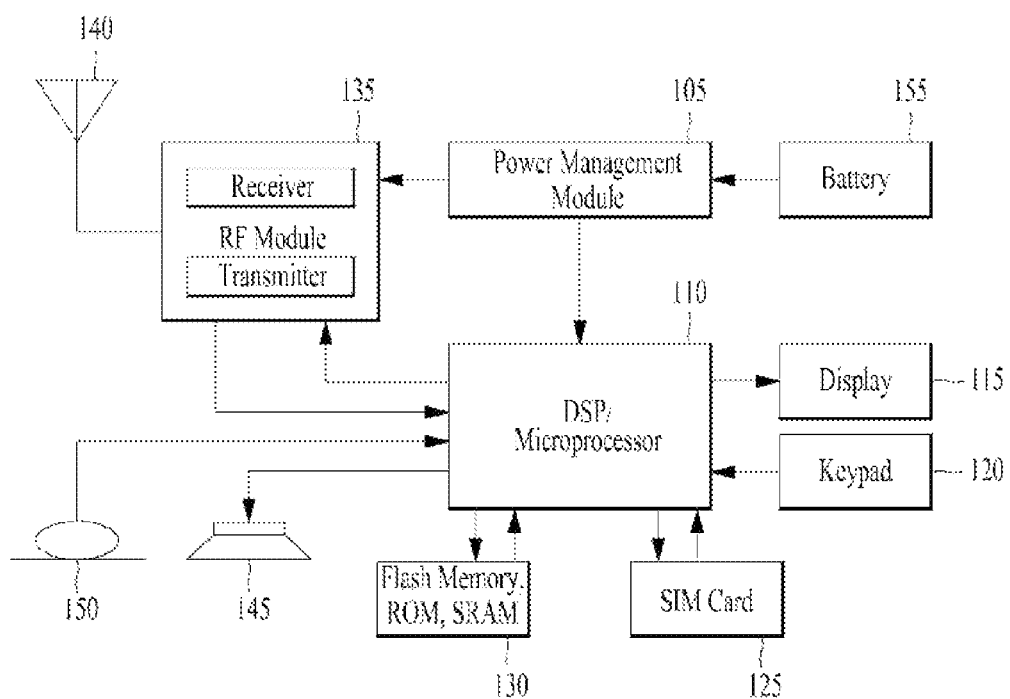

【Figure 7】
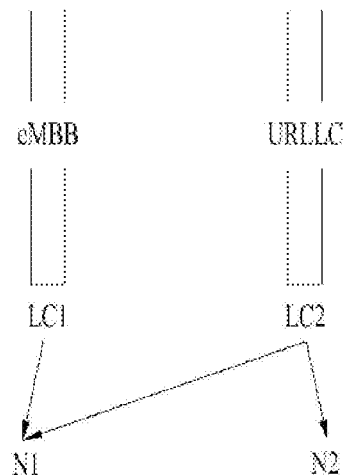
【Figure 8】
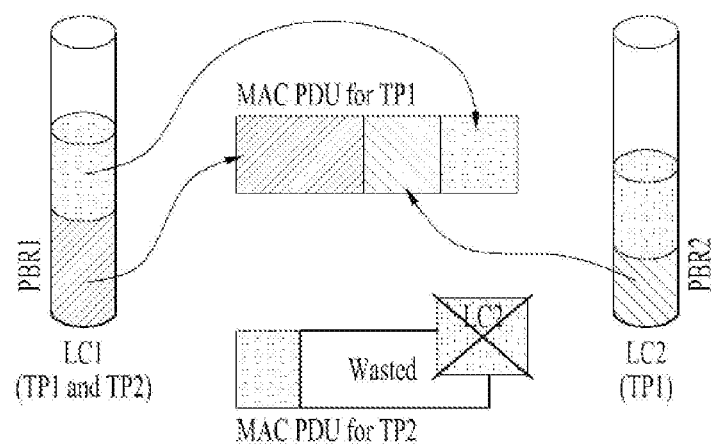

[Figure 9]
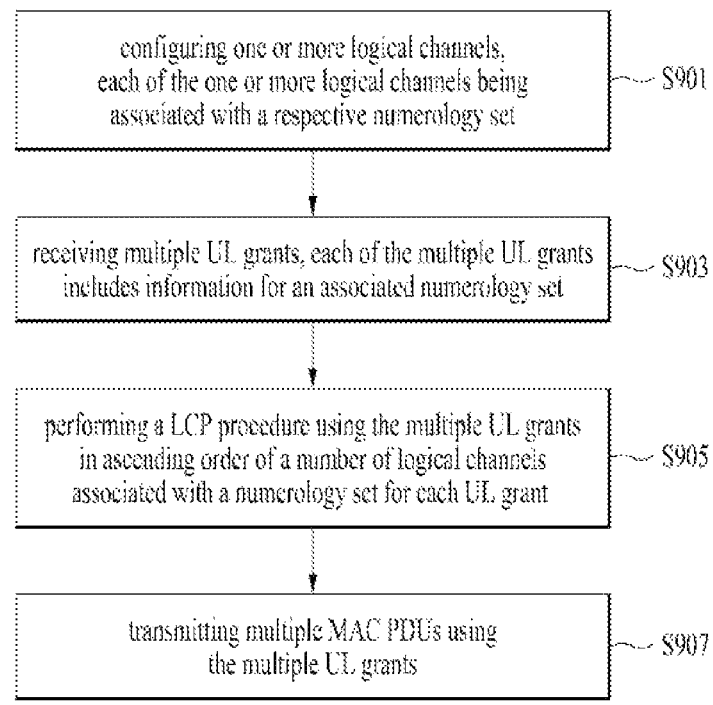

[Figure 10a]
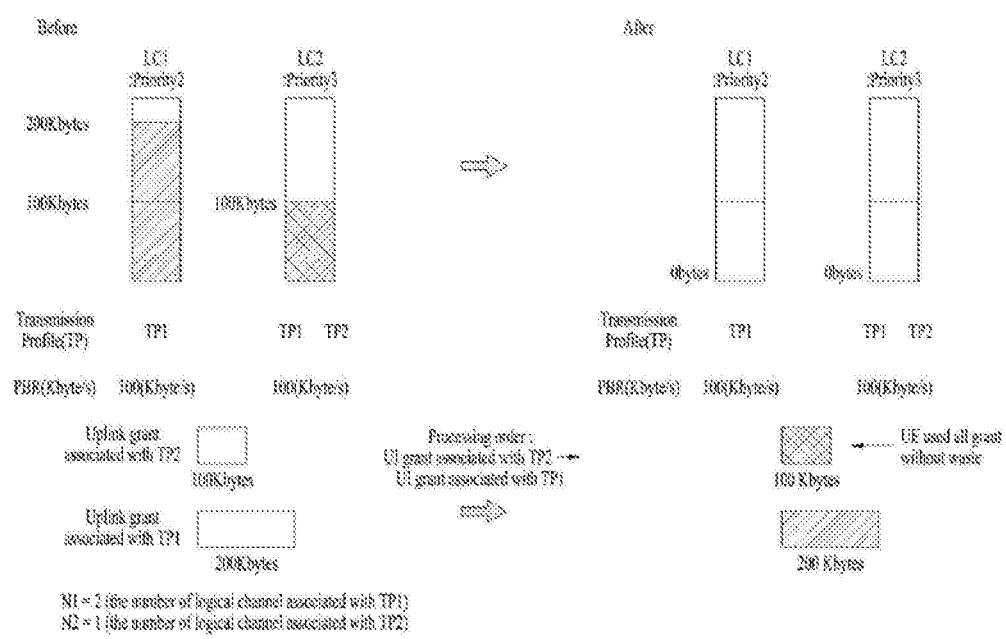

[Figure 10b]
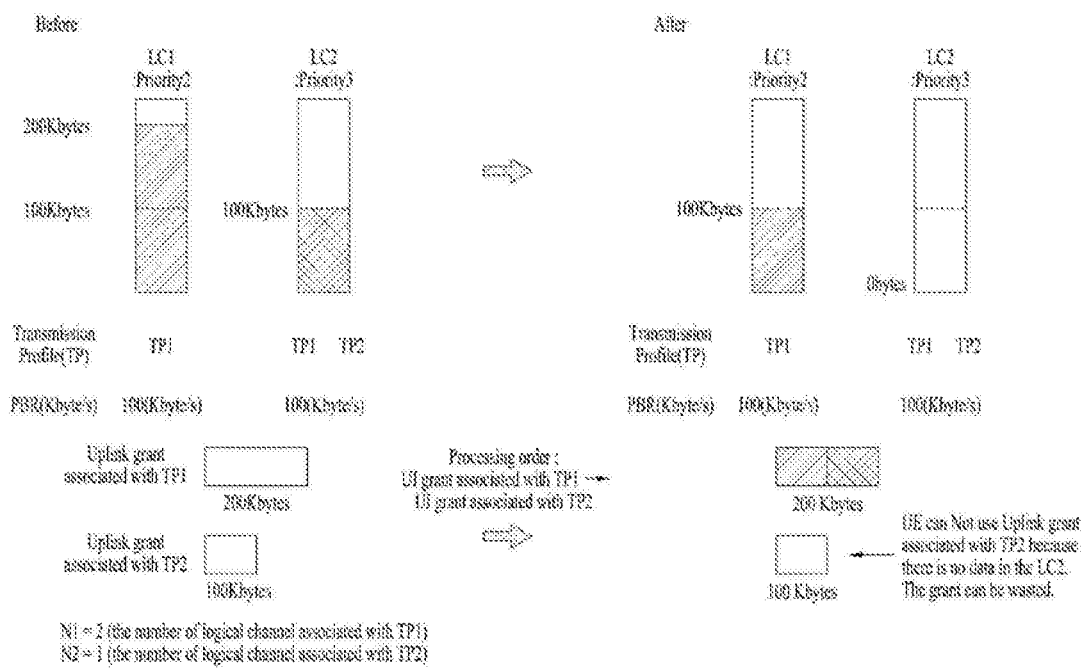

METHOD FOR PERFORMING A LCP PROCEDURE IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/008168, filed on Jul. 19, 2018, which claims the benefit of U.S. Provisional Application No. 62/535,237, filed on Jul. 21, 2017, the contents of which are all hereby incorporated by reference herein in their entireties.

TECHNICAL FIELD

The present invention relates to a wireless communication system and, more particularly, to a method for performing a Logical Channel Prioritization (LCP) procedure in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for performing a Logical Channel Prioritization (LCP) procedure in wireless communication system.

In NR, the UE performs a LCP procedure only to the relevant logical channel for the UL grant. That is, the UE doesn't perform the LCP procedure to all the logical channel. With this restriction, if it is up to UE implementation which UL grant to process first, the waste of uplink grant may occur. So, there is a need for a new mechanism to reduce the waste of uplink grant when the UE receives multiple uplink grants at the same time.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, when the UE generates multiple MAC PDUs for multiple UL grants at the same point in time, the UE generates MAC PDUs by using UL grants in increasing order of number of logical channels associated to the numerology set of each UL grant.

According to the present invention, since the UE performs a LCP procedure in ascending order of a number of logical channels associated with a numerology set for each UL grant, the UE can efficiently use the received UL grant.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a block diagram of a communication apparatus according to an embodiment of the present invention;

FIG. 7 is an example of mapping between Logical Channel and Numerology;

FIG. 8 is a diagram illustrating an example of a problem that may occur in the LCP procedure performed in NR;

FIG. 9 is a conceptual diagram for performing a Logical Channel Prioritization (LCP) procedure according to embodiments of the present invention; and FIG. 10a is an example for performing a LCP procedure according to embodiments of the present invention, and FIG. 10b is an example for performing a LCP procedure not based on the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 7 is an example of mapping between logical channel and numerology.

In NR, there will be a mapping between a logical channel and numerology, where different logical channels can be mapped to the same numerology and one logical channel can be mapped to multiple numerologies.

The QoSs of different logical channels (services) are different. For example, URLLC has tighter latency requirement than eMBB. When a URLLC service triggers a SR, the required UL grant should be mapped to a numerology/TTI type with short latency. On the other side, for eMBB service, a UL grant with a numerology/TTI type of long latency is enough. The same principle applies to the periodical transmission as well as prohibition of SR. Recent RAN1 agreement to support short-periodicity SR can be used to help meet the UL scheduling latency requirements. A SR requiring a UL grant with a numerology/TTI type of short latency needs to have shorter SR periodicity and SR prohibit timer than that requiring a UL grant with a numerology/TTI type of long latency. Therefore, both SR periodicity and SR prohibit timer should be configured for each numerology/TTI type by network.

In NR, multiple numerologies is to be used in order to enable flexible scheduling. For example, 30 kHz of subcarrier spacing allows more frequent scheduling within a subframe as the symbol length is decreased to 0.5 ms. Scheduling with different numerologies could be possible in TDM or FDM manner. If different numerologies are used for scheduling based on FDM manner, the radio condition may be different between numerologies.

In NR, RRC additionally controls the LCP procedure by configuring mapping restrictions for each logical channel:

i) allowedSCS-List which sets the allowed Subcarrier Spacing(s) for transmission ii) maxPUSCH-Duration which sets the maximum PUSCH duration allowed for transmission iii) configuredGrantType1Allowed which sets whether a configured grant Type 1 can be used for transmission iv) allowedServingCells which sets the allowed cell(s) for transmission.

When a logical channel is configured to the UE by RRC signaling, one of combinations including allowedSCS-List, maxPUSCH-Duration, configuredGrantType1Allowed, and allowedServingCells is also configured with together.

The one of the combinations including allowedSCS-List, maxPUSCH-Duration, configuredGrantType1Allowed, and allowedServingCells is associated with a numerology of a logical channel that are configured with one the combinations.

Each fields of allowedSCS-List, maxPUSCH-Duration, configuredGrantType1Allowed, and allowedServingCells is included in LogicalChannelConfig message.

A 'allowedSCS-List' field indicates that: if present, UL MAC SDUs from this logical channel can only be mapped to the indicated numerology. Otherwise, UL MAC SDUs from this logical channel can be mapped to any configured numerology.

A 'maxPUSCH-Duration' field indicates that: if present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration.

A 'configuredGrantType1Allowed' field indicates that: if present, UL MAC SDUs from this logical channel can be transmitted on a configured grant type 1.

A 'allowedServingCells' field indicates that: if present, UL MAC SDUs from this logical channel can only be mapped to the serving cells indicated in this list. Otherwise, UL MAC SDUs from this logical channel can be mapped to any configured serving cell of this cell group.

FIG. 8 is a diagram illustrating an example of a problem that may occur in the LCP procedure performed in NR.

According to LTE, the RRC controls the scheduling of uplink data by signalling for each logical channel for performing the LCP procedure: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR X TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR X BSD, where PBR and BSD are configured by upper layers.

The MAC entity shall perform the following Logical Channel Prioritization procedure when a new transmission is performed. The MAC entity shall allocate resources to the logical channels in the following steps:

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s).

Step 2: the MAC entity shall decrement Bj by the total size of MAC SDUs served to logical channel j in Step 1.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

Above all, when the MAC entity is requested to transmit multiple MAC PDUs in one TTI, Steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

In NR, the RRC additionally controls the LCP procedure by configuring mapping restrictions for each logical channel, as mentioned before.

The MAC entity should consider allowedSCS-List, maxPUSCH-Duration, configuredGrantType1Allowed, and allowedServingCells for each logical channel for the Step 1.

So, when a new transmission is performed, the MAC entity selects the logical channels for each UL grant that satisfy all the following conditions before allocating resources to the logical channels:

the set of allowed Subcarrier Spacing index values in allowedSCS-List, if configured, includes the Subcarrier Spacing index associated to the UL grant; and maxPUSCH-Duration, if configured, is larger than or equal to the PUSCH transmission duration associated to the UL grant; and configuredGrantType1Allowed, if configured, is set to TRUE in case the UL grant is a Configured Grant Type 1; and allowedServingCells, if configured, includes the Cell information associated to the UL grant.

And then, the MAC entity allocates resources to the logical channels as follows when a new transmission is performed:

Step 1: selected logical channels for the UL grant with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s).

Step 2: the MAC entity decrements Bj by the total size of MAC SDUs served to logical channel j above; and Step 3: if any resources remain, all the selected logical channels are served in a strict decreasing priority order (regardless of the value of Bj) until either the data for that logical channel or the UL grant is exhausted, whichever comes first. Logical channels configured with equal priority should be served equally.

The all steps of the LCP procedure mentioned above means that the UL grant corresponding to a particular transmission information (i.e., a numerology set) cannot contain data of a logical channel corresponding to other transmission information than the particular transmission information.

If the MAC entity is requested to simultaneously transmit multiple MAC PDUs, or if the MAC entity receives the multiple UL grants within one or more coinciding PDCCH occasions (i.e. on different Serving Cells), it is up to UE implementation in which order the grants are processed.

Meanwhile, if the UE receives multiple uplink grants at the same time, the waste of uplink grant may occur according to processing order.

For example, as shown in FIG. 8, when a logical channel 1 (LC1) is mapped to a numerology set 1 (N1) and N2, and LC2 is mapped to N1, if the UE processes the UL grant with N1 first, the UL grant with N2 may be wasted in case LC1 data is already included in the UL grant with N1 and LC2 data cannot be included in the UL grant with N2 even though there are remaining space in UL grant with N2.

So, there is a need for a new mechanism to reduce the waste of uplink grant when the UE receives multiple uplink grants at the same time FIG. 9 is a conceptual diagram for performing a Logical Channel Prioritization (LCP) procedure according to embodiments of the present invention.

For this, in this invention, when the UE generates multiple MAC PDUs for multiple UL grants at the same point in time, the UE checks the number of the logical channels mapped to the numerology set (i.e., the transmission profile) of each UL grant. The UE generates a MAC PDU for the UL grant of which numerology set is associated with a smaller number of the logical channels prior to generating a MAC PDU for the UL grant of which numerology set is associated with a larger number of the logical channels. In other words, the UE generates MAC PDUs by using UL grants in increasing order of number of logical channels associated to the numerology set of each UL grant.

Transmission profile (TP) refers to a numerology set including subcarrier spacing, TTI duration, etc. In the following description, the numerology set and the transmission profile can be considered to have the same meaning.

Further, in the same sense, Uplink transmission information may be used instead of the Transmission Profile (TP). The Subcarrier Spacing index, PUSCH transmission duration and Cell information are included in Uplink transmission information received from lower layers for the corresponding scheduled uplink transmission.

When a network (e.g. gNB) configures one or more logical channels to a UE, the gNB configures a numerology set associated with the logical channel (S901).

For configuring a numerology set associated with a logical channel, the eNB configures mapping restrictions for each logical channel via RRC signaling. The gNB configures a UE with one or more logical channels and a numerology set associated with each of the logical channel. The gNB configures one or more numerology sets per one logical channel.

The same numerology set can be configured for different logical channels, or different numerology set can be associated with different number of logical channels.

Each of the one or more logical channels being associated with a respective numerology set.

If the gNB provides an UL grant to the UE, the gNB provides a numerology set associated with the UL grant together with the UL grant (S903).

Each of the multiple UL grants includes information for an associated numerology set.

Preferably, the UE receives multiple UL grants from the gNB for which the UE generates multiple MAC PDUs at the same point in time.

Preferably the multiple UL grant are received in a same time, or the multiple UL grant on which MAC PDUs are transmitted in a same time.

That is, the UE receives multiple UL grants at the same point in time, e.g., same TTI, same slot, same mini-slot, different TTI, or the UE transmits multiple MAC PDUs at the same point in time by using the multiple UL grants, e.g., same TTI, same slot, same mini-slot, different TTI.

The UE performs a LCP procedure using the multiple UL grants in ascending order of a number of logical channels associated with a numerology set for each UL grant (S905).

The base station additionally controls a LCP procedure by configuring mapping restrictions for each logical channel.

For detail, the UE generates multiple MAC PDUs for multiple UL grants at the same point in time during the LCP procedure as follows:

The UE checks the number of the logical channels associated with a numerology set (i.e. TP) of each UL grant. When the UE counts the number of logical channels associated with the TP, the UE only counts the logical channels having data available for transmission, i.e., the logical channel for which the data volume is not zero.

The UE processes the UL grants in increasing order of the number of the logical channels associated with the TP of each UL grant. In other words, the UE first selects the UL grant of which TP is associated with the first smallest number of logical channels (N1), and generates a MAC PDU for the selected UL grant; After processing the first selected UL grant, the UE selects another UL grant of which TP is associated with the second smallest number of logical channels (N2), where N1<N2, and generates a MAC PDU for the selected UL grant.

If the numbers of logical channels associated with the TP of UL grants are the same for different UL grants, the UE processes the UL grants in random order.

During a LCP procedure based on a numerology set, the UL grant corresponding to a particular transmission information (i.e., a numerology set) cannot contain data of a logical channel corresponding to other transmission information than the particular transmission information.

The UE transmits the generated multiple MAC PDUs to the gNB (S907).

Preferably, one MAC PDU including data from logical channels associated with a certain numerology set of the generated multiple MAC PDUs is transmitted using an uplink grant associated with the certain numerology set.

FIG. 10a is an example for performing a LCP procedure according to embodiments of the present invention, and FIG. 10b is an example for performing a LCP procedure not based on the present invention.

Example of proposed method when the UE generates multiple MAC PDUs by using multiple UL grants at the same time is described below and FIG. 10a:

The UE is configured with logical channels LC1 and LC2, where LC1 is associated with TP1 and LC2 is associated with TP1 and TP2.

Preferably, Transmission profile (TP) refers to a numerology set including subcarrier spacing, TTI duration, etc. In the following description, the numerology set and the transmission profile can be considered to have the same meaning.

Further, in the same sense, Uplink transmission information may be used instead of the Transmission Profile (TP). The Subcarrier Spacing index, PUSCH transmission duration and Cell information are included in Uplink transmission information received from lower layers for the corresponding scheduled uplink transmission.

When the UE receives two UL grants ULGrant1 and ULGrant2, where ULGrant1 is associated with TP1 and ULGrant2 is associated with TP2, the UE checks the number of logical channels associated with TP of each UL grant.

Let's assumed that the MAC SDUs are configured according to Table 1.

TABLE 1

Priority, PBR, remaining MAC SDU and Profile ID settings

| Logical Channel (LC) | Priority | PBR (Kbytes/s) | Remaining MAC SDU (Kbytes) | Transmission Profile (TP) |
|---|---|---|---|---|
| 1 | 2 | 100 | 200 | 1 |
| 2 | 3 | 100 | 100 | 1.2 |

According to result of checking, the UE knows that the number of logical channels associated with TP1 of ULGrant 1 (N1) is 2 and the number of logical channels associated with TP2 of ULGrant2 is 1 (N2), i.e., N2<N1.

So, according to the proposed method, the UE first selects ULGrant2 prior to ULGrant1 because TP2 of ULGrant2 is associated with the smallest number of logical channels and TP1 of ULGrant1 is associated with the second smallest number of logical channels. The UE generates a MAC PDU2 for the ULGrant2 first, and then generates a MAC PDU1 for the ULGrant1, and transmits the generated MAC PDU1 and MAC PDU2 to the gNB.

As shown FIG. 10a, since the UE performs a LCP procedure in ascending order of a number of logical channels associated with a numerology set for each UL grant, the UE can use all grant without waste.

Meanwhile, as shown FIG. 10b, if the UE selects uplink grant associated with the transmission profile (TP) 1 prior to uplink grants associated with transmission profile (TP) 2, this uplink grant associated with TP2 is wasted because there is no remaining MAC SDUs in the logical channel 2 after selecting uplink grant associated with TP1.

Since there is no consideration like as our proposals, the UE cannot use the UL grant associated with TP2 because there is not data in the LC2.

According to our invention, the UE may select the UL grant by taking the number of logical channels mapped to the TP of the UL grant into account. In detail, the UE selects the uplink grant with TP associated with smaller number of logical channels first than the uplink grant with TP associated with larger number of logical channels. In FIG. 10b, the UE needs to select UL grant with TP2 first because one logical channel is associated with TP2 and two logical channels are associated with TP1. In this way, the UE can minimize the wasted UL grant due to LCP restriction.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a User Equipment (UE) operating in a wireless communication system, the method comprising:
receiving multiple uplink (UL) grants, in a state that the UE is configured to one or more logical channels, each of the one or more logical channels being associated with a respective numerology set;

wherein each of the multiple UL grants includes information for an associated numerology set; and performing a logical channel prioritization (LCP) procedure using the multiple UL grants in ascending order of a number of logical channels associated with a numerology set for each UL grant, wherein based on the UE counting the number of logical channels associated with the numerology set of each UL grant, the UE only counts logical channels having data available for transmission.

2. The method according to claim 1, wherein the UE generates a Medium Access Control (MAC) Protocol Data Unit (PDU) for a UL grant of which a numerology set is associated with a smaller number of logical channels prior to generating a MAC PDU for a UL grant of which a numerology set is associated with a larger number of logical channels during the LCP procedure.

3. The method according to claim 2, further comprising:
transmitting multiple MAC PDUs using the multiple UL grants,
wherein a MAC PDU including data from logical channels associated with a certain numerology set is transmitted using an uplink grant associated with the certain numerology set.

4. The method according to claim 1, wherein if the number of logical channels associated with the numerology set of two or more different UL grants are same, the UE processes the UL grants in random order.

5. The method according to claim 1, wherein the multiple UL grant are received in a same time, or the multiple UL grant on which MAC PDUs are transmitted in a same time.

6. A User Equipment (UE) for operating in a wireless communication system, the UE comprising:
a Radio Frequency (RF) module; and
a processor operably coupled with the RF module and configured to:
receive multiple uplink (UL) grants, in a state that the UE is configured to one or more logical channels, each of the one or more logical channels being associated with a respective numerology set;

wherein each of the multiple UL grants includes information for an associated numerology set; and perform a logical channel prioritization (LCP) procedure using the multiple UL grants in ascending order of a number of logical channels associated with a numerology set for each UL grant, wherein based on the UE counting the number of logical channels associated with the numerology set of each UL grant, the UE only counts logical channels having data available for transmission.

7. The UE according to claim 6, wherein the UE generates a Medium Access Control (MAC) Protocol Data Unit (PDU) for a UL grant of which a numerology set is associated with a smaller number of logical channels prior to generating a MAC PDU for a UL grant of which a numerology set is associated with a larger number of logical channels during the LCP procedure.

8. The UE according to claim 7, wherein the processor is further configured to:
transmit multiple MAC PDUs using the multiple UL grants,
wherein a MAC PDU including data from logical channels associated with a certain numerology set is transmitted using an uplink grant associated with the certain numerology set.

9. The UE according to claim 6, wherein if the number of logical channels associated with the numerology set of two or more different UL grants are same, the UE processes the UL grants in random order.

10. The UE according to claim 6, wherein the multiple UL grant are received in a same time, or the multiple UL grant on which MAC PDUs are transmitted in a same time.

11. The UE according to claim 6, wherein the UE is capable of communicating with at least one of another UE, a UE related to an autonomous driving vehicle, a base station or a network.

* * * * *